No. 883,660. PATENTED MAR. 31, 1908.
J. W. MARR.
MEASURING CALIPERS.
APPLICATION FILED NOV. 7, 1907.
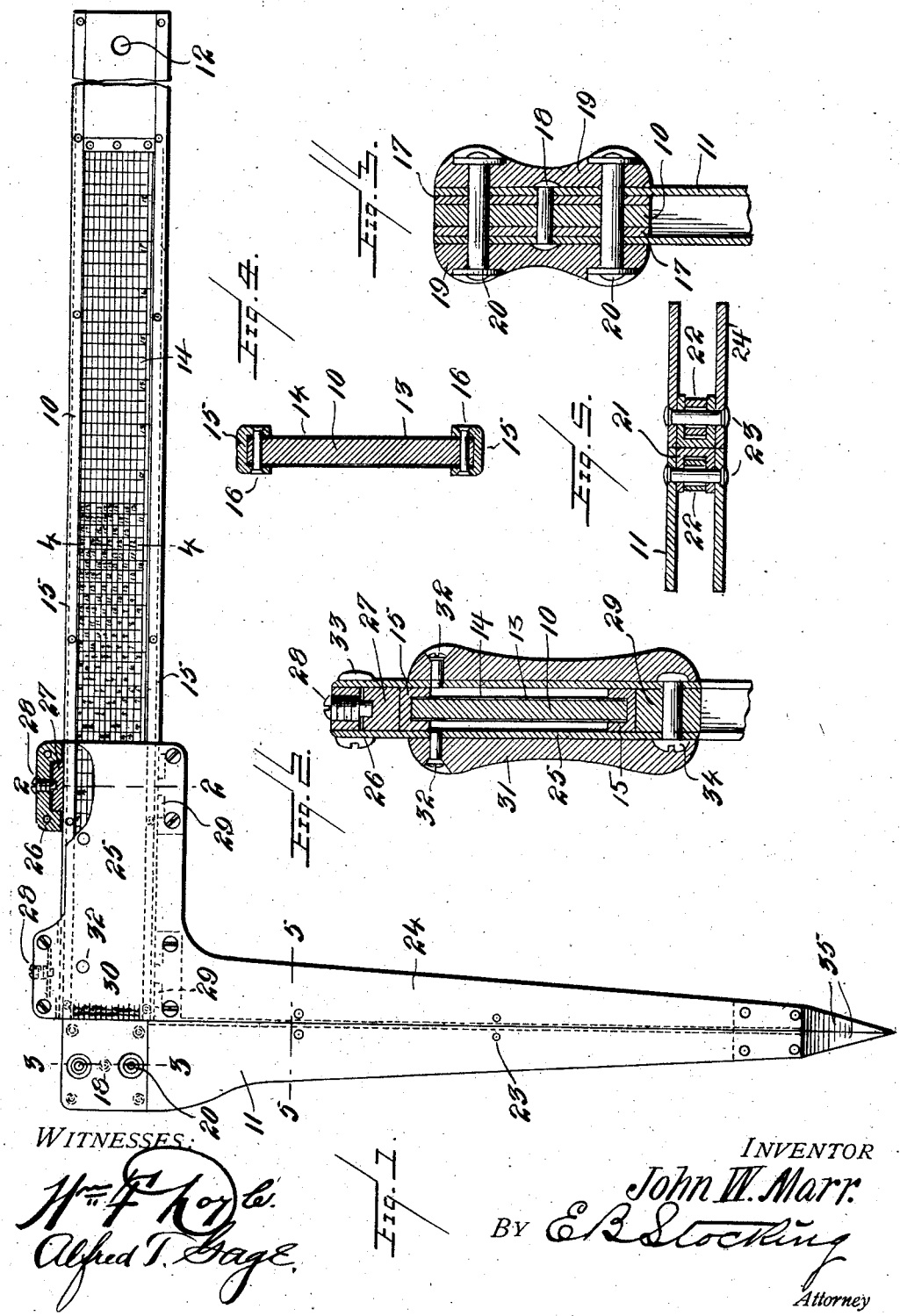
WITNESSES:
INVENTOR
John W. Marr.
BY
Attorney

UNITED STATES PATENT OFFICE.

JOHN W. MARR, OF WATERVILLE, MAINE, ASSIGNOR TO HOLLINGSWORTH AND WHITNEY COMPANY, OF BOSTON, MASSACHUSETTS, A CORPORATION OF MASSACHUSETTS.

MEASURING-CALIPERS.

No. 883,660.   Specification of Letters Patent.   Patented March 31, 1908.

Application filed November 7, 1907. Serial No. 401,093.

*To all whom it may concern:*

Be it known that I, JOHN W. MARR, citizen of the United States, residing at Waterville, county of Kennebec, and State of Maine, have invented certain new and useful Improvements in Measuring-Calipers, of which the following is a specification, reference being had therein to the accompanying drawing.

This invention relates to a measuring caliper and particularly to a device of that character adapted to measure the cubic contents of an object.

The invention has for an object to provide a novel and improved construction of the beam and means for retaining thereon the graduated strip together with the coöperating movable jaw slidably mounted upon said beam.

A further object is to provide a novel construction of the beam whereby it may be formed of light material and properly braced to stand the rough usage to which it is subjected in lumbering districts.

Other and further objects and advantages of the invention will be hereinafter fully set forth and the novel features thereof defined by the appended claims.

In the drawing:—Figure 1 is an elevation of the calipers; Fig. 2 is an enlarged vertical section on the line 2—2, Fig. 1; Fig. 3 is a similar view on line 3—3, Fig. 1; Fig. 4 is a like section on the line 4—4, Fig. 1, and Fig. 5 is a horizontal section on the line 5—5, Fig. 1.

Like numerals refer to like parts in the several figures of the drawing.

The beam 10 may be of any desired material or configuration, preferably formed of metal and provided at one end with the fixed jaw 11 and at its other end with the aperture 12 to which the usual measuring wheel can be applied when desired. This beam has disposed upon one or both faces thereof a graduated strip 13 of paper or other desired material upon which properly arranged indications are clearly printed, and in order to protect this strip from wear and injury by which the indications thereon are rendered indistinct a transparent covering strip 14 is provided and may be formed of celluloid or any desired transparent material. These strips are secured to the beam 10 by the clips 15 at the top and bottom of the beam, these clips being held in position by the bolts or rivets 16 extending through the beam and the flanges of the clips.

The fixed jaw 11 is secured to the end of the beam by embracing the sides thereof, as shown in Fig. 3, and between the plates of the jaw and the beam filling pieces 17 of any desired material are inserted, these parts being held in contact by the rivets 18. Upon the outer faces of the jaw plates are the wooden or fiber pieces 19, riveted in position, as shown at 20.

In order that the jaws may be of sufficiently light material and yet embody the necessary rigidity to prevent accidental bending and the consequent inaccuracy of measurement the plates thereof are disposed at opposite sides of the angle iron 21 having interposed a thimble 22, and all of the parts are secured together by the rivets 23 extending therethrough.

The movable jaw 24 is formed at its upper end with the slide casing 25 embracing the beam 10 and provided with a plurality of sockets 26 within which bearing blocks 27 of suitable antifriction material are disposed, and these blocks are held in contact with the clips 15 at the opposite edges of the beam by means of the tension screws 28 which adjust the casing to the proper fit upon the rule and bring the lower bearings 29 into contact therewith. The inner end of this sliding casing is provided with a series of horizontal graduations 30 having indicating characters thereon and adapted to coöperate with the vertical graduations upon the beam for the purpose of reading the result of the measurement therefrom. The casing may be covered with wood or other suitable material 31 to protect the hands of the user from contact with the cold metal thereof, and such a covering may be secured in position by rivets 32, as shown in Fig. 2. The bearing blocks 27 and 29 are readily removable by means of the screws 33 and 34, respectively by which access thereto may be had. Each of the jaws is provided with the usual steel point 35 secured at the lower end thereof.

In the use of the invention the jaws are separated to embrace the log or other object the cubic contents of which is to be measured and the reading thereof is obtained at the inner edge of the movable jaw where the indications thereon correspond with those upon the beam. The character of these indications may be varied as found most desirable and convenient for the class of work in hand. The structure of the beam thoroughly protects the graduations thereon which may be clearly printed upon paper or other material and when covered by the transparent strip and confined by the clips is effectually protected against moisture or other usage in the rough handling to which instruments of this character are often subjected in lumbering work. Heretofore the indications upon the beams of devices of this character have been frequently obliterated by the friction of the sliding jaw which quickly removes the protecting varnish and exposes these graduations. The structure of the beam also provides proper bearings for the sliding jaw upon which the jaw is adjustable as to tension so as to secure an even movement thereof without unnecessary friction or looseness of fit. The structure of the jaws combines lightness of weight and absolute rigidity so that the parallelism of the meeting edges thereof is maintained.

Having described my invention and set forth its merits, what I claim and desire to secure by Letters Patent is:—

1. In a measuring caliper, a fixed jaw provided with an angularly disposed beam, a graduated strip upon said beam, a separate transparent covering strip removably disposed over the graduated strip, clips having flanges embracing the upper and lower edges of said beam and strips, securing devices extending through said clips and beam, and a movable jaw mounted to travel upon said clips.

2. In a measuring caliper, a beam provided with a fixed jaw, a movable jaw having a casing comprising opposite plates separated by a block having a socket at one edge of the beam and slidably mounted thereon, a bearing block mounted in said socketed block, and an adjusting screw mounted in said socketed block and contacting with the bearing block carried thereby.

3. In a measuring caliper, a beam provided with a fixed jaw, a movable jaw having a casing slidably mounted on said beam, bearing blocks mounted in said casing, an adjusting screw mounted in said casing and contacting with said bearing blocks, a protected graduated strip upon said beam, and retaining clips at the opposite edges of the beam embracing said strip and connecting with the blocks of said casing.

4. In a measuring caliper, a beam, fixed and movable jaws extending therefrom and composed of opposite plates with an interposed angle iron, a thimble within said iron, and securing means extending through said plates, angle iron and thimble.

In testimony whereof I affix my signature in presence of two witnesses.

JOHN W. MARR.

Witnesses:
H. D. BATES,
CHAS. McGANN.